No. 775,982. PATENTED NOV. 29, 1904.
W. B. MASON.
OIL PUMP.
APPLICATION FILED JULY 1, 1903.
NO MODEL.
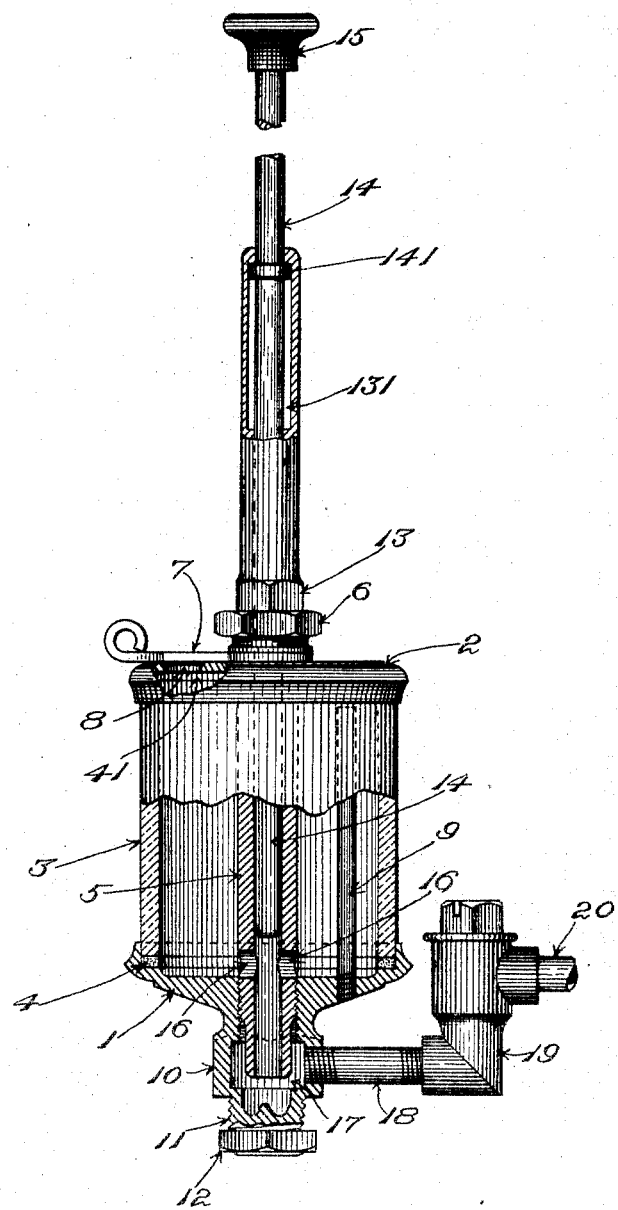
Witnesses:
Oscar F. Hill
Alice H. Morrison
Inventor:
William B. Mason
By Macleod, Calver & Randall
Attorneys.

No. 775,982.                                                              Patented November 29, 1904.

UNITED STATES PATENT OFFICE.

WILLIAM B. MASON, OF BOSTON, MASSACHUSETTS, ASSIGNOR TO THE MASON REGULATOR COMPANY, OF BOSTON, MASSACHUSETTS, A CORPORATION OF MAINE.

OIL-PUMP.

SPECIFICATION forming part of Letters Patent No. 775,982, dated November 29, 1904.

Application filed July 1, 1903. Serial No. 163,861. (No model.)

*To all whom it may concern:*

Be it known that I, WILLIAM B. MASON, a citizen of the United States, residing at Boston, in the county of Suffolk, State of Massachusetts, have invented a certain new and useful Improvement in Oil-Pumps, of which the following is a specification, reference being had therein to the accompanying drawing.

In steam-engines it is generally considered necessary to provide some means of lubrication for the pistons which work in the cylinders. As the interior of the cylinder is under high pressures which vary at different times, this is a problem of considerable difficulty, particularly in steam-propelled automobiles, where the pressures used in the cylinders are very high. High pressures also require a greater amount of lubrication than low pressures. In automobiles cylinder lubrication has sometimes been furnished by an oil-pump continuously operated during the running of the machine by connection with the running parts or by a separate engine. This method is unsatisfactory, because a greater amount of oil is forced into the cylinder than is necessary for actual lubrication, and this waste and unused oil finds its way into the condenser and eventually back into the boiler, fouling the boiler, and thereby retarding the production of steam. It is therefore very desirable that some means of supplying oil to the cylinder be provided which shall be under the control of the operator of the engine or automobile, as the case may be, and which shall be operated only at such times as are necessary for the proper lubrication of the cylinder.

With this end in view I have devised a small compact oil-pump and oil-receptacle combined, which may be operated by hand very easily and which will furnish to the cylinders the required amount of oil.

Although my device is suitable for use on any engine which requires cylinder lubrication or in connection with any device where it is necessary to pump a fluid in small quantities to a reservoir which is under pressure, it is designed particularly for use in automobiles. When so used, it can be placed directly in front of the seat of the automobile, so that the operating-handle stands between the front board of the seat and the legs of the operator. When so placed, it is necessary that the operating parts of the oil-pump be entirely free from oil in order that the clothes of the operator may not be injured by contact with them. It is also necessary that the oil-pump be so located that at any time the operator may see how much oil there is in the oil-receptacle and may also fill it conveniently. My device furnishes a convenient means of obviating the difficulties which are stated above.

My invention is fully set forth in the following description in connection with the accompanying drawing, and the novel features therein are pointed out and clearly defined in the claims at the close of the specification.

The drawing shows an elevation of my device, partly in section, to illustrate more clearly the construction of the interior portions.

Referring now to the drawing, 1 is a base and 2 is a top, which, with a cylindrical body 3, form an oil-receptacle. In order that the operator may see the amount of oil contained in his pump at any given time, I make the body 3 of glass. Between the base 1 and the body-piece 3 I place a washer or gasket 4, of cork, rubber, or other suitable material, in order that there may be a perfectly tight joint between the body-piece and the base. A similar gasket or washer 41 is placed between the body 3 and the top 2. Passing down through a hole in the center of the top 2 is a tube 5, threaded at the bottom and screwed into the base 1. I make the top of the tube 5 with a projecting flange and nut 6, so that the entire tube may be rotated, and thus raised or lowered with relation to the base 1, the said flange or nut 6 bearing upon a combined washer and swinging plate 7, which in turn rests upon the top 2. By this means I am enabled to fasten the base, body, and top together firmly, so that the whole becomes a tight receptacle for oil. In the top 2 is an inlet-hole 8 for oil. This inlet-hole 8 is closed by the combined washer and swinging plate 7, above referred to. By means of this inlet-hole the operator is enabled to fill the oil-receptacle when desired.

The base 1 has a stem 10 on its lower side centrally placed with relation to the said base and terminating in a securing-bolt 11, on which is placed a check-nut 12. This securing-bolt 11 may be screwed into the frame of the engine or automobile, as the case may be, and furnishes a convenient means of holding the oil-pump in place.

In the base 1 and lying outside of the stem 10 is a hole in which is placed an oil-overflow pipe 9, the top of the oil-overflow pipe being adjusted to the height required by the circumstances. This oil-overflow pipe 9 also affords a means for relieving back pressure which may accumulate in the oil-receptacle by reason of leakage of the check-valve in the oil-delivery pipe.

Screwed or otherwise suitably secured to the tube 5 is a stem 13, which, together with the tube 5, forms a guide for the pump-plunger 14 in such a manner that the danger of binding or cramping is reduced to a minimum. The said plunger 14 is furnished with a knob or handle 15 for convenience in operating the same.

In order that the length of stroke of the plunger 14 may be limited to a distance less than the length of the stem 13, the following means is provided: The stem 13 is bored out to a larger diameter for a sufficient distance, as shown at 131. The plunger 14 is provided with a collar 141, which is fixed to the said plunger at the proper point. This collar 141 comes in contact with the shoulders at the ends of the larger bore 131 of the stem 13, thereby limiting the stroke to the desired length and preventing the exposure of oily parts of the plunger.

In the tube 5 at the upper surface of the base 1 are two inlet-holes 16, which allow oil to pass from the oil-receptacle into the tube 5. Within the stem of the base 1 is a cavity 17 of any convenient shape. Connected with the cavity 17 is a connecting-pipe 18, leading to a check-valve 19 of any well-known form, which in turn leads to the oil-delivery pipe 20. The lower end of the tube 5 projects downward into the chamber 17 to a point preferably below the lower edge of the connecting-pipe 18.

When it is desired to operate the oil-pump, the operator grasps the handle 15 and raises it to the limit of its stroke, thereby allowing the oil in the receptacle to flow by gravity through the holes 16 and fill the lower end of the tube 5, the cavity 17, the connecting-pipe 18, and the lower part of the check-valve 19. This takes place nearly instantaneously, and under ordinary circumstances these portions will always be partly filled with oil. The operator then pushes down the pump-plunger 14, thereby forcing an amount of oil equal in volume to the capacity of the lower end of the tube 5 through the check-valve 19 and into the oil-delivery pipe 20. The amount of oil which will be delivered to the cylinder at one stroke of the pump is determined by the size and length of stroke of the plunger.

While I have described my invention in the form which is the best now known to me, it is evident that there are many possible modifications all within the spirit of the invention as set forth in the specification and claims.

I claim as my invention—

1. In an oil-pump apparatus, the combination of a receptacle for oil, a pump-cylinder and plunger therein, an oil-delivery pipe or passage provided with a check-valve, and an overflow-pipe whereby oil in said receptacle is prevented from rising above a certain level and pressure in the oil-receptacle caused by leakage of said check-valve may be relieved, substantially as described.

2. In an oil-pump apparatus, the combination with an oil-receptacle, of a pump-cylinder extending vertically through said receptacle and extended above the latter to afford a guiding-stem, a pump-piston passing through said cylinder and its extension, and means within the cylinder extension for limiting the stroke of said piston.

In testimony whereof I affix my signature in presence of two witnesses.

WILLIAM B. MASON.

Witnesses:
 GEORGE P. DIKE,
 ALICE H. MORRISON.